Nov. 28, 1961    C. E. MARION ET AL    3,010,529
SCALE WEIGHBRIDGE LOCK-OUT MEANS
Filed Oct. 22, 1959    2 Sheets-Sheet 1
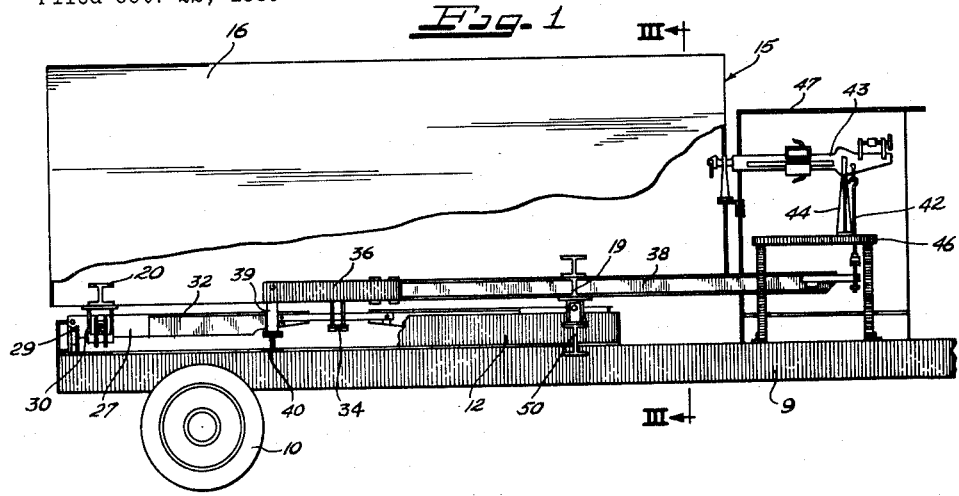
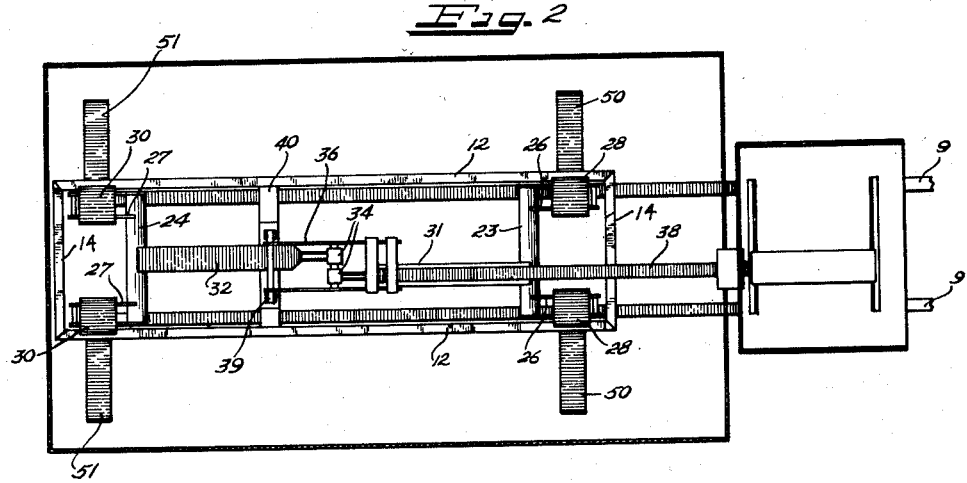
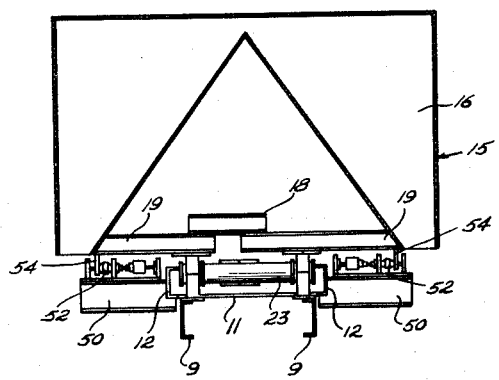
INVENTORS
CLYDE E. MARION
RICHARD T. BARTLETT
GEORGE C. CLARK
BY George A. Woodruff
ATTORNEY Nov. 28, 1961  C. E. MARION ET AL  3,010,529
SCALE WEIGHBRIDGE LOCK-OUT MEANS
Filed Oct. 22, 1959  2 Sheets-Sheet 2
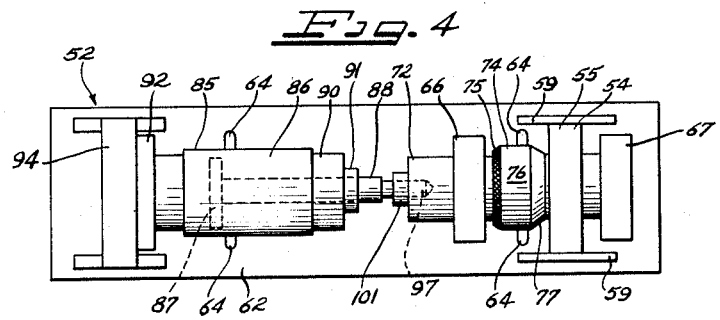
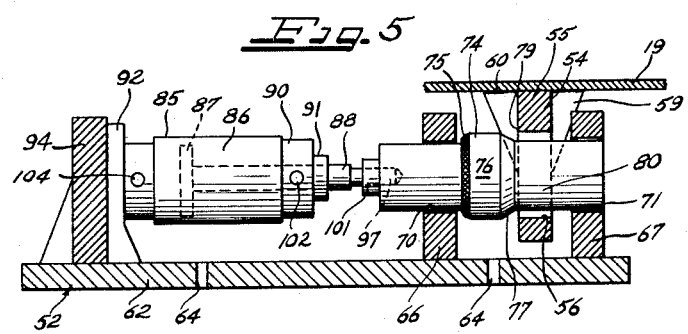
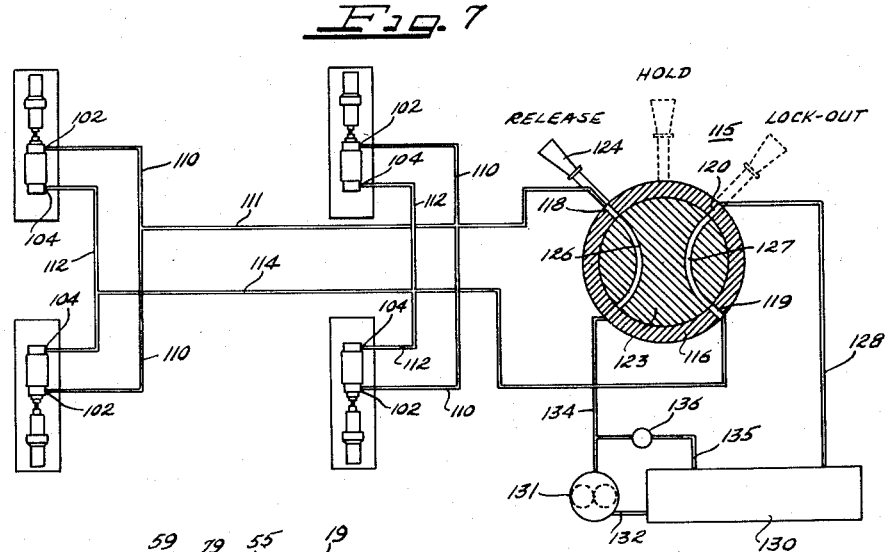
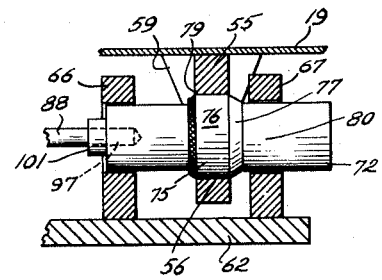
INVENTORS
CLYDE E. MARION
RICHARD T. BARTLETT
GEORGE C. CLARK
BY George A. Woodruff
ATTORNEY

United States Patent Office 3,010,529
Patented Nov. 28, 1961

3,010,529
SCALE WEIGHBRIDGE LOCK-OUT MEANS
Clyde E. Marion, Oakland, Richard T. Bartlett, Castro Valley, and George C. Clark, Oakland, Calif., assignors to Fairbanks, Morse & Co., Chicago, Ill., a corporation of Illinois
Filed Oct. 22, 1959, Ser. No. 848,101
4 Claims. (Cl. 177—151)

This invention relates to improvements in weight measuring apparatus or weighing scales, and more particularly to certain improvements in weighing scales carried on or embodied in a vehicle such as a motor truck or the like.

The present invention, while capable of application to both portable and non-portable weighing apparatus generally, has particular utility and advantages in vehicle or motor truck scales wherein objects, materials or other matter of fluid or solid nature, are received on the scale weighbridge not only for the purpose of weighing the same, but also to be retained on the weighbridge for vehicle transport thereof to one or more points of use. In scales so employed, it is important and necessary to continued utility and accuracy of the scale that the scale pivot bearings and lever system be protected against vibrating and other shock forces consequent to vehicle travel, including stresses imposed thereon in out-of-level positions of the scale weighbridge.

Accordingly, the principal object of the present invention is to provide improved mechanism effective between the scale frame and weighbridge, which is operable selectively to and from a first control condition wherein the mechanism effectively restrains the weighbridge against movements relative to the frame and relieves the scale bearing and lever system from sole support of the weighbridge on the frame.

Another object is to provide mechanism for the purpose indicated, which is operable selectively to and between the first control condition referred to in the foregoing object and a second control condition wherein the mechanism is effective relative to the weighbridge, such as to retain the weighbridge against inordinate or undesirably great movements responsively to load application in weighing operations.

A further object is to provide mechanism of the character indicated which embodies a plurality of like motor actuated units in suitable relatively spaced positions between the scale frame and weighbridge, and includes control provisions for causing substantially simultaneous operation of the motor means of the units, whereby the units are simultaneously operable to effect either the first or the second control condition of the mechanism as aforesaid.

Yet another object is to provide mechanism comprised of like motor actuated units each cooperable with a member on the weighbridge in the control conditions of the mechanism as aforesaid, wherein the units include cam means engageable with the associated weighbridge members upon operation of the units to effect the aforesaid first control condition of the mechanism, such as to facilitate attainment of full cooperation of the units with the weighbridge members in said first control condition of the mechanism.

The foregoing as well as further objects and advantages of the present invention, will appear from the following description of a presently preferred embodiment of the invention as such is illustrated in the accompanying drawing, in which:

FIG. 1 is a view in side elevation of a vehicle shown in part only embodying weighing apparatus including the stop device mechanism of the present invention, and with portions of the assembly broken away for clarity of detail;

FIG. 2 is a plain view of the vehicle portion shown in FIG. 1 and the scale apparatus thereon, but with the scale weighbridge and stop mechanism removed;

FIG. 3 is a transverse sectional view as taken from line 3—3 in FIG. 1;

FIGS. 4 and 5 are, respectively, enlarged plan and side elevational views of the stop device forming the subject of the invention, the side view of FIG. 5 showing portions of the device in section, and showing an associated portion of the weighbridge;

FIG. 6 is a fragmentary sectional side elevation of the stop device, showing one control condition thereof, and FIG. 7 illustrates diagrammatically, a hydraulic pressure control system in association with the motor means of the mechanism.

Referring to FIGS. 1 to 3, weighing apparatus including the mechanism of the present invention, is embodied in a vehicle, such as an automotive truck, truck trailer, wagon, etc., indicated in part by the longitudinal vehicle frame members 9 and rear wheel 10. Mounted upon and suitably secured to the vehicle frame members 9 is a weighing apparatus base or scale frame 11 including longitudinal beams 12 rigidly joined at the ends thereof by transverse beams 14. Overlying the scale frame is a scale weighbridge structure 15 which in the present example is shown as a box-like hopper assembly 16 having a bottom frame shown only in part, as including a forward transverse beam assembly 18 the ends 19 of which project outwardly (laterally) from the scale frame longitudinal beams 12 (FIG. 3), and rear transverse beam assembly indicated at 20 (FIG. 1) similarly having its ends (not shown) laterally beyond the scale frame beam 12. It is to be noted here that in a vehicle embodied weighing scale with which the present invention has particular utility, the scale weighbridge may be of any desired form, as of open platform type, or in the form embodying a hopper as illustrated or any other container, for receiving objects, material or matter to be weighed and transported. Therefore, the term "weighbridge" as employed herein and in the appended claims, shall have the foregoing meaning, i.e. without restriction to the hopper shown.

The weighbridge 15 is carried by the scale frame 11 through a pivoted lever system which may be of any suitable or desired construction, as the particular form and details thereof do not comprise any part of the present invention. It is deemed unnecessary, then, to show all details of the lever system here utilized. However, such parts thereof as appear in the drawings (FIGS. 1 to 3), include a main lever (shown of pipe lever form) 23 transversely between the scale frame beams 12 near the forward ends thereof, and a like main lever 24 similarly positioned near the rear ends of the beams 12 (FIG. 2). Main lever 23 provides a projecting arm structure 26 at each end with each arm terminating in the adjacent corner region of scale frame 11, while the other main lever 24 likewise has projecting arm structures 27 at its ends, extending to the adjacent corner region at the opposite or rear end of the scale frame. Each of the arms 26 and 27 has suitable pivotal support on the scale frame 11, one such support being indicated at 29 in FIG. 1. The weighbridge 15 is carried by the main levers through pivot bearing chairs 28 in pivoted support on main lever arms 26, and pivot bearing chairs 30 in pivotal support on main lever arms 26. One such chair 30, is indicated in FIG. 1 in side view. Main lever 23 includes a projecting lever beam 31, while main lever 24 has a like projecting lever beam 32, the free ends of these lever beams being pivotally connected through pivot slings 34 to the rear end 36 of scale output lever 38. The lever 38 is pivotally supported at its rear end 36 on a pedestal 39 carried by a cross-beam 40 of the scale frame 11, and extends longitudinally of the vehicle frame forwardly to connection with a steelyard 42 depending from the scale balance (poise) beam 43. The balance beam is pivotally carried on a standard 44 mounted on platform structure 46, all within a suitable protective enclosure or cab 47 on the vehicle frame.

It is apparent that in a vehicle embodied scale apparatus such as that hereinabove described, the scale pivot bearing and lever system will be subjected to more or less severe stresses and shock forces with resultant damage patricularly to the bearings, upon and during vehicle travel. In this respect, the impact on the system will be considerably more severe when the weighbridge is under load, as with material in the weighbridge hopper in the present example. Such reaction in the scale system cannot be effectively overcome merely by holding the balance beam 43 in fixed position, as by the usual provision for fixing the balance beam when the scale is not in weighing operation. Any attempt to use the balance beam for this purpose, would result in severe stressing and damage to the beam and its pivot bearing on standard 44. Therefore, it is important to the continued utility and accuracy of the vehicle embodied scale apparatus, to provide or incorporate therein effective means for affording in positive manner, full protection of the scale bearing and lever system against inordinate stress and damage during vehicle travel. The present invention, then is directed to the provision of means for this purpose, which is of improved character and affords full protection of the scale bearing and lever system during vehicle travel with a load retained on the weighbridge, as for transport thereof to any desired location or point of use.

The provision here made for the foregoing purpose, comprises motor operated mechanism effective between the scale frame fixed on the vehicle frame, and the scale weighbridge. More particularly, the mechanism provides a plurality of identical stop devices applied to the weighbridge at spaced points thereof selected such as to facilitate effective movement restraining control of the weighbridge. To the latter end and conveniently in the present example, the scale frame 11 is provided with forward and rear beam sections 50 and 51 in rigid securement to each longitudinal frame beam 12. Each of the forward beam sections 50 extends in cantilever manner, laterally from its beam 12 and in underlying alignment with one end portion 19 of the forward weighbridge beam assembly 18 (FIGS. 1 and 3), while each rear beam section 51 extends similarly, in underlying alignment with one end portion 22 of the rear weighbridge beam assembly 20. One of the aforesaid stop devices is associated with each beam section 50 and the adjacent weighbridge beam end portion 19, and with each beam section 51 and the adjacent weighbridge beam end portion 22. Each such device comprises, in general, a motor operated stop portion 52 provided as a unit in mounted support on a beam section (50—51), and a cooperating stop portion 54 in depending rigid securement to the adjacent weighbridge beam end portion (19—22) near the outer end of the latter (FIG. 3). Since the stop devices are identical, the following detail description of one thereof will suffice in respect to all of the devices.

With particular reference to FIGS. 4 to 6, the stop device includes stop portion 54 provided as a rigid member or plate 55 of suitable thick-section material, having a circular aperture 56 therethrough, of a predetermined diameter. Secured to each side of the plate 55 is a flange plate 59. The member is rigidly attached to one of the weighbridge beam end portions (19—22) near the outer end thereof, in depending projection therefrom such as to overly the associated beam section (50—51) inwardly near the outer end of the latter (FIG. 3). Attachment of the member may be effected in desired manner, as by weldments between the weighbridge beam end and the member and its flange plates 59, such weldments being shown in part at 60 in FIG. 5.

The motor operated stop portion 52 is here provided as a unit, including a base plate 62 for seating the unit on a beam section (50—51) to which it is adjustably secured as by bolting (not shown) through slots 64 in the base plate. Upstanding on the plate 62 are plate elements 66 and 67 in parallel spaced apart relation as shown, with the stop member 55 extending parallel to the plate elements therebetween and in a position relatively near the plate element 67. The plate elements 66 and 67, which may be secured to base plate 62 as by welding, have aligned circular openings 70 and 71, respectively, for receiving and supporting a rod 72 of circular periphery. Rod 72 extends through the aperture 56 of stop portion 54, and is axially shiftable to either of two control positions to be referred to presently. On a portion of the rod between the plate elements 66 and 67 is an abutment 74 which may be provided as an annular collar welded to the rod as at 75. The collar presents an outer cylindrical abutment surface 76 preferably of a width approximating the thickness of the stop plate 55, and formed to have a diameter less than but closely approximating the diameter of the stop plate aperture 56, for close reception in the latter opening in the control position of the rod shown in FIG. 6. In addition, at the side of the collar facing the stop plate 55 is a member 77 providing an annular bevelled edge surface constituting a cam for cooperation with the circular marginal portion or edge 79 of the stop plate aperture 56, to facilitate entrance and full reception of the collar abutment in such aperture upon axial shift of the rod to its control position illustrated in FIG. 6. Member 77 may be an integral part of collar 74 or a ring weldment of suitable hard weld metal securing the collar to the rod and having its periphery bevelled to provide the aforesaid cam surface.

FIGS. 4 and 5 illustrate the rod 72 in one control position, wherein the abutment 74 is entirely clear of the weighbridge stop plate 55, while the rod portion 80 adjacent abutment 74 is disposed in the aperture 56 of plate 55. As a feature of the present invention, the rod 72 is provided or formed so that the diameter of its portion 80 is less than the diameter of plate aperture 56 to a predetermined appreciable extent substantially as indicated in FIG. 5. The predetermined diameter of rod portion 80 is such as to afford clearance sufficient to free the weighbridge for movements in normal weighing operation of the scale apparatus within its capacity, yet such as to constitute the rod portion 80 as a stop effective for limiting or restricting the weighbridge against inordinate or undesirably great movements as would otherwise tend to occur in response to sudden or impact application of more or less heavy loads on the weighbridge.

The other position of rod 72 is that illustrated in FIG. 6, wherein the rod is axially displaced (slidably in its bearing supports 66 and 67) to locate the abutment 74 in close reception or seating in the plate aperture 56 of the weighbridge carried stop 54. In such position of the rod, the abutment 74 effectively restricts the weighbridge against movement relative to the scale frame 11, and affords direct support of the weighbridge and any load thereon, on the scale frame 11 through the rod 72, its bearing supports 66, 67, the base plate 62 and the associated one of the scale frame beam sections 50—51. Thus the stop provision when in such control position preventing weighbridge movement and supporting the weighbridge directly on the scale frame, thereby relieves the scale bearing and lever sytsem from weighbridge support, with resultant protection of the system from damaging stress and shock forces which otherwise would be imposed thereon in vehicle travel and particularly while in transport of a load retained on the weighbridge.

It will be appreciated that at the time the rod 72 is displaced toward the control position shown in FIG. 6, the weighbridge may occupy a position disposing the stop portion 54 such that its plate aperture 56 is out of exact axial registry with the abutment 74, i.e. a condition of non-coincidence of the aperture axis with the rod axis. That condition may obtain to a more or less slight degree in the normal balanced, load weighing state of the scale apparatus, and to a larger degree in the scale unbalanced state. The foregoing is the reason, then, for the provision of the abutment cam element 77. As the rod is displaced (through motor means presently to be described) to the weighbridge holding and supporting position, the cam 77 engages the aperture margin 79 of stop 54 and thereby produces movement of the weighbridge to a position centering the stop plate aperture 56 with the abutment 74 for reception of the abutment therein.

The stop unit 52 includes motor means 85 for effecting displacement of the rod 72 to either of its aforesaid control positions. Such motor means may be of any suitable kind or type having ample power capacity to effect positive displacement of the rod, and particularly rod displacement to seating of the abutment 74 in the stop plate aperture 56, which may require cam-displacement of the weighbridge (as described above) even though the latter be then under load up to the maximum capacity of the weighbridge. In the present example, the motor means is shown as a hydraulic servomotor or ram having a cylinder 86 and a piston 87 slidable therein and connected to piston rod 88 projecting from one end 90 of the cylinder through a seal gland 91. The servomotor is mounted at its rear end 92 on a bracket 94 upstanding on the unit base plate 62, and extends toward the rod 72 in a position having the longitudinal axis of the piston rod 88 substantially aligned with the longitudinal axis of rod 72. The projecting end of piston rod 88 provides a threaded terminal portion 97 received in a threaded bore formed in the adjacent end of rod 72, and retained therein as by a lock nut 101. In one end of the cylinder 86 is a combined fluid inlet and discharge port 102 (FIG. 5) for cylinder admission and discharge of fluid relative to one side of the piston 87, while in the opposite cylinder end is a like port 104 (FIG. 5) for the admission and discharge of fluid relative to the opposite side of the piston. The ports 102 and 104 are connected to piping in a hydraulic pressure fluid supply and control system now to be described.

In the present embodiment of the invention, the servomotors of all of the stop devices are operated substantially simultaneously and such as to effect selectively, corresponding simultaneous positionment of the stop devices in one or the other of the hereinbefore described weighbridge control positions. To that end a fluid pressure supply and control system such as that illustrated diagrammatically in FIG. 7, is here provided in common connection to the servomotors. As shown, branch conduits or pipes 110 connect the ports 102 of the servomotors to a common header 111, while branch conduits or pipes 112 connect the servomotor ports 104 to a second common header 114. At a suitable point on the vehicle, which may be in the weigh beam cab 47 or in the driver's compartment or cab (not shown) of the vehicle, is a control valve 115. Valve 115, may be of well known and readily available type suitable to the purpose, is here indicated as including circular valve casing 116 having diametrically opposite ports 118 and 119, and like diametrically opposite ports 120 and 122 displaced by ninety degrees from the diametrical position of the first mentioned ports. Operative in the valve casing is a rotary valve member 123 actuated through valve handle 124, the valve member having a pair of like port-interconnecting passages 126 and 127. Headers 111 and 114 are connected to valve ports 118 and 119, respectively, while a conduit 128 connects valve port 120 with a supply container or sump 130 containing hydraulic fluid such as oil or the like. Sump 130 may be located either near the valve 115 or elsewhere on the vehicle. A suitable pressure pump 131 (here indicated as a gear pump) which may be operated by the vehicle engine or any other motive power (not shown) provided on the vehicle, has its suction side connected to the sump 130 by pipe 132 and its pressure delivery side connected by pipe 134 to the valve port 122. A bypass 135 is provided between pipe 134 and the sump 130, and contains a one-way pressure relief valve 136 set to open for pump bypass to the sump in response to excessive-pressure in the conduit 134 such as obtains in operation of valve 115 to close port 122.

In operation of the hydraulic system, when it is desired to place the weighbridge stop devices in the control positions freeing the weighbridge for weighing operations, the valve handle 124 is moved to the "Release" position shown in solid lines in FIG. 7. This locates the valve member 123 in a position having the passage 126 interconnecting valve ports 122 and 118, and passage 127 interconnecting valve ports 119 and 120. The pump 131 then supplies pressure fluid through port 122, passage 126, port 118 and the header 111 to the servomotor cylinder ports 102, thereby producing substantially simultaneous operation of the servomotors such that each displaces its connected stop device rod 72 to one control position having the rod portion 80 effective in the plate aperture 56 of the weighbridge carried stop portion 54. With pressure fluid thus admitted by ports 102 to the servomotor cylinders on one side of the piston therein, fluid in the cylinders on the opposite sides of the pistons is exhausted through cylinder ports 104 and conduits 112 to header 114, thence through port 119, passage 127 and port 120 of the control valve 115, and pipe 128 to the sump 130. Once the servomotors are thus operated to effect the indicated positions of the stop devices (clearing the scale weighbridge for weighing operations), such positioning of the stop device may be maintained for as long as desired merely by moving control valve handle 124 to the indicated intermediate or "Hold" position shown in broken lines. This locates the valve passages 126—127 out of registry with any of the valve ports, thereby trapping fluid pressure in header 111 and in the servomotor cylinders on one side of the pistons therein.

Now, when it is desired to effect reverse operation of the servomotors as to place the stop devices in the control positions restricting the weighbridge against movements as hereinbefore described, the control valve handle 124 is moved from the "Hold" position to the "Lock-Out" position (as shown in broken lines). This locates the valve member 123 to interconnect valve ports 118 and 120 by passage 126, and ports 122 and 119 by passage 127. The pump then supplies pressure fluid, via valve port 122, passage 127, port 119, to the header 114 and therefrom to the servomotor cylinder ports 104, for causing substantially simultaneous reverse displacements of the servomotor pistons to locate the stop devices in the other control positions thereof having the abutments 74 in the plate apertures 56 of the weighbridge stop portions 54. The pressure capacity of the system and servomotors as herein employed, is entirely sufficient to assure entrance and seating of the abutments 74 in plate apertures 56 through the action of the cam elements 77 (as hereinbefore described) even under heavy or maximum load on the weighbridge. With fluid pressure admission to the cylinders through ports 104, fluid on the opposite sides of the servomotor pistons then is exhausted through cylinder ports 102 and conduits 110 to the header 111, for return via port 118, passage 126 and port 120 of the control valve 115, and pipe 128, to the sump 130. Once the "Lock-Out" positions of the stop devices is effected, such may be maintained by moving the valve handle 124 to the intermediate or "Hold" position. Although not shown, suitable releasable catch means may be associated with the control valve handle 124 for releasable retention of the valve member 123 in any one of its three control positions, with such catch means serving, also, to indicate and determine proper valve member positionment in each control position.

In the present embodiment of the invention, it is to be noted as appears more particularly in FIG. 3, that the weighbridge devices are made effective between the weighbridge and scale frame at points laterally of the weighbridge near the outer sides thereof. Such locations of the stop devices afford greater effectiveness and stability in the "Lock-Out" functions thereof to restrain the weighbridge against movements, especially during vehicle travel in transport of a load on the weighbridge.

Having now described and illustrated a presently preferred form of the invention, it is to be understood that alterations and modifications may be made in respect thereto without departing from the spirit and scope of the invention as hereinafter claimed.

What is claimed is:

1. In a vehicle mounted weighing scale providing a scale frame fixed to the vehicle, a weighbridge including a container for material to be weighed and transported, lever means supporting the weighbridge on the scale frame for movement relative thereto in weighing material received in the container, and weight indicator means on the vehicle in actuated connection to said lever means; mechanism operable for limiting the extent of movement of the weighbridge in weighing operation and for restraining the weighbridge against movement relative to the scale frame during vehicle travel, said mechanism comprising members fixed to the weighbridge in relatively spaced positions thereon and each having a circular aperture therethrough, a rod movably carried on the scale frame adjacent each of said members and extending through the aperture of the associated member, an abutment on the rod having a circular periphery of a diameter closely approaching the diameter of the aperture in the associated member, a portion of the rod adjacent said abutment being of a diameter substantially less than the diameter of the aperture in the associated member, said rod being movable into and out of a position wherein said abutment engages the aperture of the associated member, to restrain the weighbridge against movement relative to the scale frame, and being movable to another position locating said rod portion in the aperture of the associated member, thereby to limit the extent of weighbridge movement in weighing operation, and piston motor means on the scale frame in connection to each rod for effecting movements thereof selectively to either of said positions.

2. In a vehicle mounted weighing scale as defined by claim 1, characterized further by control means for controlling operation of the said motor means to effect concurrent movement of the said rods selectively to the said one position and the said another position thereof.

3. In a vehicle mounted weighing scale providing a scale frame secured upon the frame of a vehicle, a weighbridge overlying the scale frame, lever means supporting the weighbridge on the scale frame for movement relative thereto in weighing operation, and weight indicator means on the vehicle actuated from said lever means; means for limiting weighbridge movement in weighing operation and for restraining the weighbridge against movement relative to the scale frame during vehicle travel, comprising members depending from the weighbridge at each end thereof in relatively spaced positions longitudinally of the weighbridge, the members each having a circular aperture therethrough, scale frame carried units individual to said members, each unit comprising a base adjustably secured to the scale frame below the associated member, bearing elements fixed to the base on opposite sides of the associated member, a rod axially slidable in the bearing elements and extending through the circular aperture of the associated member, an abutment on the rod having a circular periphery of a diameter less than but closely approximating the diameter of the circular aperture in the associated member, the rod providing a portion thereof adjacent said abutment having a diameter substantially less than the diameter of the circular aperture in the member, and fluid pressure operated piston motor means on the base in operative connection to said rod, for effecting axial displacement thereof to and between a first position having said abutment entered in the circular aperture of the associated member and a second position having said rod portion in the circular aperture of the associated member, the rods of the units upon motor displacement of each thereof to said first position, then being effective through the rod abutments in the circular apertures of the associated members, to restrain the weighbridge against movement relative to the scale frame, and the rods in motor displacement of each thereof to said second position, then being effective through said rod portions in the circular apertures of the associated members, to limit weighing operation movement of the weighbridge relative to the scale frame, and control means on the vehicle including a source of fluid pressure, common to the motor means of said units for causing simultaneous operation of the motor means to effect concurrent displacement of said rods of the units selectively to said first and second positions.

4. In a vehicle mounted weighing scale as defined in claim 3, wherein the said abutment on the rod of each of the said units has an edge thereof forming a cam which is engaged with the associated member at its marginal portion defining the circular aperture therein, upon displacement of the rod to the said first position thereof, whereby to effect alignment of the member for reception of the rod abutment in the circular aperture of the member.

References Cited in the file of this patent
UNITED STATES PATENTS
2,314,552    Orr ------------------ Mar. 23, 1943